Aug. 8, 1961   W. K. THOMAS   2,994,959
SURVEYING MACHINE
Filed Dec. 15, 1958   2 Sheets-Sheet 1
Fig.1
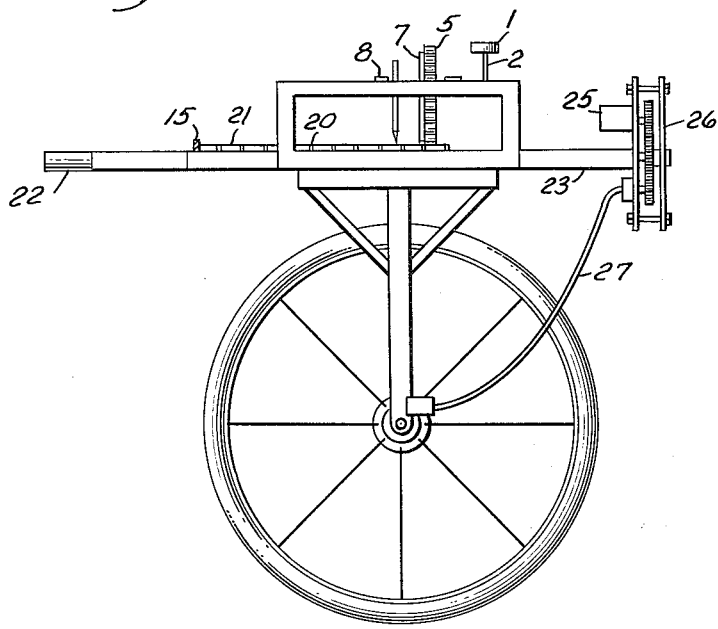
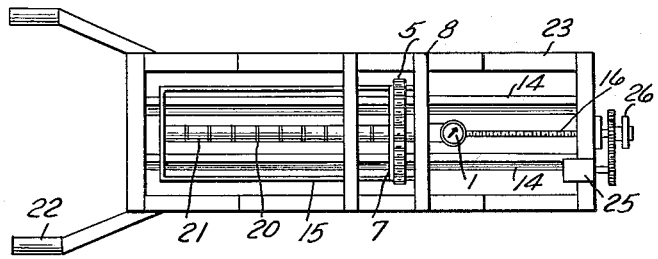
Fig.2
INVENTOR
William Henney Thomas

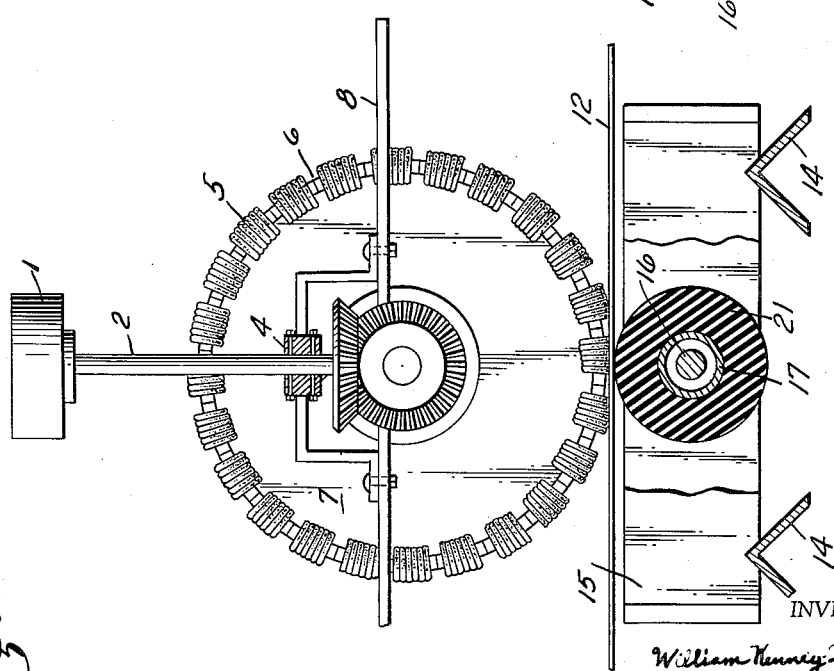

United States Patent Office 2,994,959
Patented Aug. 8, 1961

2,994,959
SURVEYING MACHINE
William Kenney Thomas, Rte. 3, Lexington, Ky.
Filed Dec. 15, 1958, Ser. No. 780,390
3 Claims. (Cl. 33—141.5)

This invention relates to systems for tracing a course of a vehicle on a map carried by it.

Though not limited thereto the system is suited for determining the area of small plots of land such as tobacco acreage allotments, namely by planimetering the perimeter of the figure traced by the vehicle.

The invention further resides in systems having the features of combinations and arrangements hereinafter described and claimed.

For more detailed understanding of the invention and for illustration of preferred forms thereof reference is made to acompanying drawings in which—

FIG. 1 is a side view schematically illustrating the mapping system.

FIG. 2 is a plan view of FIG. 1.

FIG. 3 schematically illustrates the orientation of the stiff flat sheet upon which the map is drawn.

FIG. 4 is a vertical view of 3.

In the preferred construction shown, power from the driving wheel contacting the ground is transmitted by flexible drive 27 to threaded screw shaft 16 causing it to rotate, threaded screw shaft 16 passes through threaded nut 18 which is secured to frame 15 causing it to move along on guides 14.

Said frame 15 is composed of members forming an elongated rectangular assembly. Tube 17 extends centrally lengthwise of this frame. Upon tube 17 a number of friction surfaced rollers 21 are antifrictionally journaled.

Said frame 15 is slidably mounted on parallel linear guides 14 fixed to the vehicle.

Stylus 13 supported by bridge 9 is in continuous contact with stiff flat sheet 12, pressure being maintained by spring 10. The spring pressure is adjusted by the positioning of collar 11 secured on stylus 13 by a screw.

When frame 15 moves, stylus 13 draws a straight line on stiff flat sheet 12, said straight line being parallel to guides 14.

Supported by bridge 8 is disc assembly 7, the disc is rimmed at 6 with a number of friction surfaced rollers 5 antifrictionally mounted, the axis of all the rollers being coplanar, the roller surface elements remote from the disc defining a substantially circular periphery for the disc.

Point of contact of each roller 5 on flat stiff sheet 12 is at such a distance from stylus 13 so that one revolution of the disc 7 will cause stiff flat sheet 12 to rotate 360 degrees about stylus 13.

Shaft 2 journaled in bracket 4 supports a compass 1 which is coupled to disc assembly 7 by bevel gears 3 so that one revolution of disc 7 will rotate the compass housing through 360 degrees.

When the heading of the vehicle is changed the operator manually turns disc 7 which in turn rotates stiff flat sheet 12 with stylus 13 as a center and by aligning a given point on the compass housing with the compass needle the stiff flat sheet 12 is oriented and stylus 13 draws a line at the required angle to the preceding line. By keeping stiff flat sheet 12 oriented each time the heading of the vehicle is changed, when the travel around the plot of ground has been completed a figure will have been drawn which when planimetered will determine the area thereof.

In using a pointer for determining the area of a plot planted to row crops (especially those crops planted on contour) a pointer is substituted for the compass. Disc 7 is manually turned so that the pointer is parallel to the row in which the vehicle is headed and regardless which way the row curves or turns as frame 15 moves, stylus 13 draws a straight line on stiff flat sheet 12. When the heading of the vehicle is changed at the end of the row disc 7 is manually turned so that the pointer parallels each row crossed. By this procedure a figure is drawn on stiff flat sheet 12 that when planimetered will determine the area thereof.

It shall be understood the invention is not limited to the particular arrangement described but that changes and modifications may be made within the scope of the appended claims.

What is claimed is:

1. An apparatus for tracing on a stiff flat sheet the course of travel of a vehicle having a ground contacting rolling wheel, said apparatus comprising parallel linear guides fixed on the vehicle, a frame slidably mounted on the guides and having means supporting the stiff sheet parallel to the direction of the guides and engaging the sheet with friction adapted to impart to it the sliding motion of the frame, means coupling the rolling wheel to the frame for driving the latter along the guides in proportion to the rotation of the wheel, a stylus, means supporting the stylus in continuous frictional contact with the sheet at a point fixed in relation to the guide, a disc rimmed with friction surfaced rollers anti-frictionally journaled thereon with their axes coplanar, the roller surface elements remote from the disc axis defining a substantially circular periphery for the disc, means mounting the disc for manual rotation about a fixed axis parallel to the guides and with said periphery in tangential engagement with said sheet at a fixed point spaced from the first named point in the direction of said rails for imparting rotation to the sheet about the first named point.

2. An apparatus as in claim 1 wherein said frame comprises members forming an elongated rectangular assembly, said supporting means comprises a tube extending centrally lengthwise of said assembly and carrying a series of friction surfaced rollers on which the stiff sheet rests, said rollers being antifrictionally journaled coaxially on the tube and constrained to move axially with the assembly, and said coupling means comprises a screw journaled in fixed position relative to the guides, connected for rotation by the rolling wheel, and extending within the tube and threadedly engaging said assembly to drive the latter along the guides.

3. An apparatus as in claim 1 further comprising a direction-indicating compass having a housing and a shaft connected thereto, and means journaling said shaft for rotation about a vertical axis fixed relative to said guides, a first bevel gear fixed on said shaft, a second shaft on which said disc is fixed, and a second bevel gear fixed on said second shaft and engaging said first bevel gear for rotation with said compass housing, the product of the gear ratio of the bevel gears by the ratio of the radius of said periphery to the spacing between said points being substantially one, whereby rotation of the compass housing relative to the guides is accompanied by equal relative rotation of the sheet.

References Cited in the file of this patent

UNITED STATES PATENTS

| 1,200,702 | Bodde | Oct. 10, 1916 |
| 1,201,139 | Bodde et al. | Oct. 10, 1916 |
| 2,649,781 | Clewell | Aug. 25, 1953 |

FOREIGN PATENTS

| 124,749 | Germany | Nov. 6, 1901 |
| 581,761 | France | Oct. 2, 1924 |